US012579115B2

(12) United States Patent
Dibia et al.

(10) Patent No.: US 12,579,115 B2
(45) Date of Patent: Mar. 17, 2026

(54) DATA HEALTH EVALUATION USING GENERATIVE LANGUAGE MODELS

(71) Applicant: Microsoft Technology Licensing, LLC, Redmond, WA (US)

(72) Inventors: Victor Chukwuma Dibia, Santa Clara, CA (US); Chenglong Wang, Bellevue, WA (US); Bongshin Lee, Issaquah, WA (US); Jeevana Priya Inala, Redmond, WA (US); John Thompson, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/374,991

(22) Filed: Sep. 29, 2023

(65) Prior Publication Data

US 2025/0110934 A1 Apr. 3, 2025

(51) Int. Cl.
G06F 16/215 (2019.01)
(52) U.S. Cl.
CPC .................................. G06F 16/215 (2019.01)
(58) Field of Classification Search
None
See application file for complete search history.

(56) References Cited

U.S. PATENT DOCUMENTS

| | | | | |
|---|---|---|---|---|
| 10,811,139 | B1 * | 10/2020 | Wang ...................... | G06N 20/20 |
| 10,923,233 | B1 * | 2/2021 | Wang ...................... | G16H 20/00 |
| 12,278,740 | B2 * | 4/2025 | Joshi ...................... | G06Q 50/10 |
| 2010/0114745 | A1 * | 5/2010 | R ............................ | G06Q 40/00 |
| | | | | 705/35 |
| 2024/0153026 | A1 * | 5/2024 | Fields .................. | G06Q 50/265 |
| 2024/0345914 | A1 * | 10/2024 | Selvaraj .............. | G05B 19/042 |
| 2024/0370595 | A1 * | 11/2024 | Vierra .................... | G06F 30/27 |
| 2024/0403567 | A1 * | 12/2024 | Dressler, II ............ | H04L 51/02 |
| 2025/0005288 | A1 * | 1/2025 | Amatriain-Rubio .... | G06F 40/35 |
| 2025/0036434 | A1 * | 1/2025 | Madison ................ | G06F 9/451 |
| 2025/0110934 | A1 * | 4/2025 | Dibia ...................... | G10L 15/16 |
| 2025/0251989 | A1 * | 8/2025 | Yang ................... | G06F 16/3329 |
| 2025/0322476 | A1 * | 10/2025 | Kharytonenka ..... | G06Q 50/205 |

OTHER PUBLICATIONS

Evaluation Agent: Efficient and Promptable Evaluation Framework (Year: 2024).*
Planning with Large Language Models via Corrective Re-prompting (Year: 2022).*
LaMDA: Language Models for Dialog Applications (Year: 2022).*

(Continued)

*Primary Examiner* — Kim T Nguyen
(74) *Attorney, Agent, or Firm* — Rainier Patents, P.S.

(57) ABSTRACT

The disclosed concepts relate to leveraging a language model to identify data health issues in a data set. One example method involves accessing a data set. The example method also involves, using an automated evaluation planning agent, inputting a prompt to generate a data evaluation plan for the data set to a generative language model, the prompt including context describing the data set. The example method also involves receiving the data evaluation plan generated by the generative language model and identifying one or more data health issues in the data set by performing the data evaluation plan using an automated evaluation plan execution agent.

19 Claims, 14 Drawing Sheets

(56)                    References Cited

OTHER PUBLICATIONS

Radford, et al., "Improving Language Understanding by Generative Pre-Training," available at https://cdn.openai.com/research-covers/language-unsupervised/language_understanding_paper.pdf, Jun. 11, 2018, 12 pages.

"How to Automate Data Cleaning in Python?", Retrieved from the Internet URL: https://www.geeksforgeeks.org/how-to-automate-data-cleaning-in-python/, May 31, 2023, 13 pages.

Amy Steier, "Comprehensive Data Cleaning for AI and ML Learn to Prepare Tabular Data for AI and ML With an End-to-End Data Cleaning Work Ow", Jul. 24, 2023, 15 pages.

Huang, et al., "When to Finish? Optimal Beam Search for Neural Text Generation (modulo beam size)", arXiv:1809.00069v1, Aug. 31, 2018, 6 pages.

International Search Report Received in PCT Application No. PCT/US2024/043122, mailed on Nov. 28, 2024, 13 pages.

Jason Weill, "Generative AI in Jupyter", Retrieved from the Internet URL: https://blog.jupyter.org/generative-ai-in-jupyter-3f7174824862, Aug. 2, 2023, 17 pages.

Kanwal Mehreen, "Data Cleaning with Pandas", Retrieved from the Internet URL: https://www.kdnuggets.com/data-cleaning-with-pandas, Sep. 5, 2023, 10 pages.

Miao, et al., "Online Hybrid CTC/Attention End-to-End Automatic Speech Recognition Architecture", IEEE/ACM Transactions on Audio, Speech, and Language Processing, vol. 28, Apr. 2020, pp. 1452-1465, 14 pages.

Watanabe, et al., "Hybrid CTC/Attention Architecture for End-to-End Speech Recognition", IEEE Journal of Selected Topics in Signal Processing, vol. 11, No. 8, Dec. 2017, pp. 1240-1253, 14 pages.

Lewis et al., "How to scale document question answering using LLMs," retrieved from the internet archive at https://web.archive.org/web/20231130182242/https:/www.sensible.so/blog/llm-document-extraction, dated Oct. 16, 2023, 13 pages.

* cited by examiner

TABLE 300

| DATE 302 | PRICE 304 |
|----------|-----------|
| 1/1/2000 | 500.21 |
| 1/2/2000 | 500.21 |
| 1/3/2000 | 500.22 |
| 1/4/2000 | 503.82 |
| 1/5/2000 | 497.44 |
| 1/6/2000 | 501.77 |
| 1/7/2000 | 506.18 |
| 1/8/2000 | 506.18 |
| 1/9/2000 | 506.18 |
| ... | ... |
| 8/1/2009 | 1024.32 |

FIG. 3A

DATA SET
SUMMARY 320

```
{
  "name": "sp500.csv",
  "file_name": "sp500.csv",
  "data set_description": "Contains the ABC stock price from 4/1/2000 to 11/1/2009.",
  "fields": [
    {
      "column": "date",
      "properties": {
        "dtype": "date",
        "min": "Apr 1 2000",
        "max": "Sep 1 2009",
        "samples": [
          "Jul 1 2001",
          "Oct 1 2003",
          "Dec 1 2003"
        ],
        "num_unique_values": 123,
        "semantic_type": "date",
        "description": "The date on which the ABC stock price was recorded."
      }
    },
    {
      "column": "price",
      "properties": {
        "dtype": "number",
        "std": 195.40774336547275,
        "min": 735.09,
        "max": 1549.38,
        "samples": [
          1211.23,
          1050.71,
          1111.92
        ],
        "num_unique_values": 122,
        "semantic_type": "number",
        "description": "The ABC stock price on the given date."
      }
    }
  ],
  "field_names": [
    "date",
    "price"
  ]
}
```

FIG. 3C

SAMPLE 510

| DATE 302 |
|:---:|
| 2/7/2000 |
| 3/12/2001 |
| 4/31/2002 |
| 6/6/2003 |
| 5/31/2004 |
| 12/1/2005 |
| 2/3/2006 |
| 2/1/2007 |
| 8/24/2008 |
| 3/4/2009 |

FIG. 5B

SAMPLE 520

| PRICE 304 |
|:---:|
| 524.32 |
| 562.81 |
| 612.94 |
| 401.37 |
| -124.27 |
| 602.12 |
| 636.40 |
| -340.23 |
| 412.32 |
| 450.31 |

FIG. 5C

902 — ACCESS DATA SET

904 — INPUT PROMPT TO GENERATIVE LANGUAGE MODEL

906 — RECEIVE DATA EVALUATION PLAN

908 — IDENTIFY DATA HEALTH ISSUES

910 — DETERMINE DATA HEALTH SCORE

912 — OUTPUT USER INTERFACE

DATA HEALTH EVALUATION USING GENERATIVE LANGUAGE MODELS

BACKGROUND

Data is used across a wide range of scenarios to make critical decisions. Advances in storage technology have made it feasible to store massive amounts of data at a reasonable cost. In addition, technologies such as solid-state storage have made it feasible to quickly process large amounts of data. However, while these advances have enabled organizations to analyze massive amounts of data quickly and make decisions based on the analysis, those decisions are still only as good as the underlying data itself.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to evaluating data health using generative language models. One example includes a method or technique. The method or technique can include a method performed on a computing device, the method comprising accessing a data set, using an automated evaluation planning agent, inputting a prompt to generate a data evaluation plan for the data set to a generative language model, the prompt including context describing the data set, receiving the data evaluation plan generated by the generative language model, and identifying one or more data health issues in the data set by performing the data evaluation plan using an automated evaluation plan execution agent.

Another example includes a system comprising a hardware processing unit, and a storage resource storing computer-readable instructions which, when executed by the hardware processing unit, cause the system to access a data set, input a prompt to a generative language model to generate a data evaluation plan for the data set, the prompt including a summary of the data set as context, receive the data evaluation plan from the generative language model, the data evaluation plan including one or more data evaluation actions, and perform the one or more data evaluation actions received from the generative language model to identify one or more data health issues in the data set.

Another example includes a computer-readable storage medium storing computer-readable instructions which, when executed by a processing unit, cause the processing unit to perform acts comprising accessing a data set, inputting a prompt to generate a data evaluation plan for the data set to a generative language model, the prompt including context describing the data set, receiving the data evaluation plan produced by the generative language model, and identifying one or more data health issues in the data set by performing the data evaluation plan.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 3A illustrates an example of a data set, consistent with some implementations of the present concepts.

FIG. 3C illustrates an example of a summary of a data set that includes annotations generated by a generative language model, consistent with some implementations of the present concepts.

FIG. 5B illustrates a first example of a sample of a field from a data set, consistent with some implementations of the present concepts.

FIG. 5C illustrates a second example of a sample of a field from a data set, consistent with some implementations of the present concepts.

DETAILED DESCRIPTION

Overview

Figure 1:
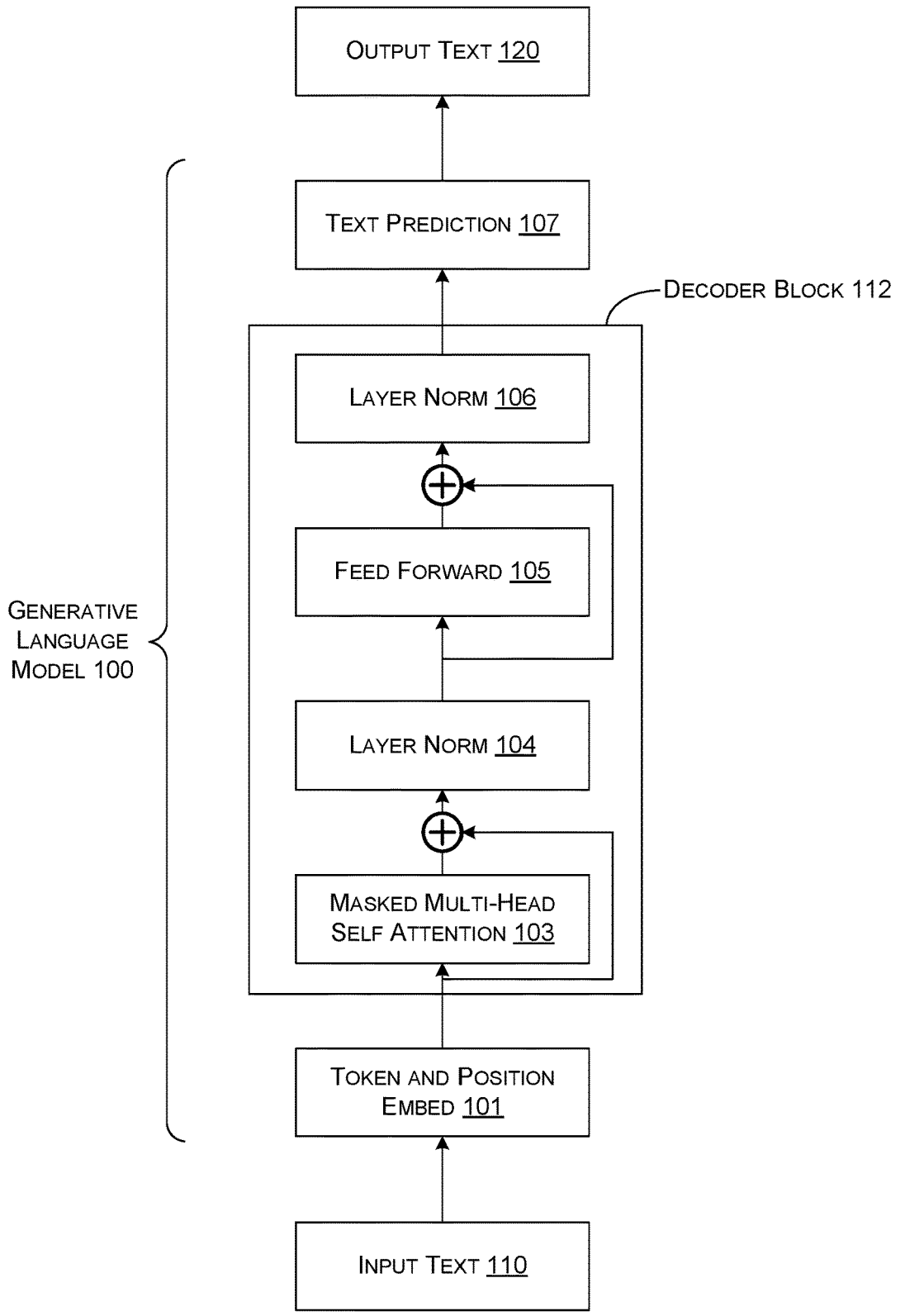
FIG. 1 illustrates an example of a generative language model, consistent with some implementations of the present concepts.

As noted above, corrupted or otherwise incorrect data can result in poor or even catastrophic decision-making. Advances in hardware allow for processing massive amounts of data very quickly, and advances in data science and machine learning allow for a deeper understanding of trends present in data. However, even the most sophisticated data analysis tools and advanced hardware can fail to produce good results when the underlying data itself is faulty.

One way to detect data quality issues is for a trained person to manually evaluate data. For example, a database administrator can review individual database tables to detect data health issues such as incorrect formatting or out-of-range values. There are also automated techniques, such as writing scripts to iterate over data looking for specific problems. However, these techniques tend to be very resource-intensive, because tools need to be developed or modified as different data sources, software, and/or hardware are used.

The disclosed implementations can overcome these deficiencies of prior techniques for evaluating data health by leveraging generative language models to help discover and, in some cases, automatically correct errors in a data set. Recent advances in language modeling, such as transformer-based generative language models (e.g., one or more versions of models such as ChatGPT, BLOOM, PaLM, and/or LLaMA), have enabled language models to achieve milestones such as passing the bar exam. These generative language models learn a wide range of concepts from massive amounts of training data, and are able to formulate data evaluation plans given appropriate queries. Thus, as discussed more below, it is possible for a generative language model to formulate customized data evaluation plans for different data sets based on the type of data that is present therein.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Terminology

For the purposes of this document, the term "language model" refers to any type of automated agent that communicates via natural language. For instance, a language model can be implemented as a neural network, e.g., a decoder-based generative language model such as ChatGPT, a long short-term memory model, etc. The term "generative model," as used herein, refers to a machine learning model employed to generate new content. Generative models can be trained to predict items in sequences of training data. When employed in inference mode, the output of a generative model can include new sequences of items that the model generates. Thus, a "generative language model" is a model that can generate new sequences of text given some input prompt, e.g., a query potentially with some additional context.

The term "prompt," as used herein, refers to input text provided to a generative language model that the generative language model uses to generate output text. A prompt can include a query, e.g., a request for information from the generative language model. A prompt can also include context, or additional information that the generative language model uses to respond to the query.

The term "data health issue" refers to any characteristic of a data set that could impact results of processing that data set. Examples of data health issues include the presence of corrupted data, erroneous data, improperly formatted data, statistical outliers, etc. The term "data evaluation action" refers to any action performed on a data set that can identify a data health issue. A "data evaluation plan" is one or more data evaluation actions that can be performed on a given data set. A "data cleaning action" is an action that attempts to improve data quality by correcting at least one data health issue, e.g., by removing an entry or value from a data set, changing a value in the data set to a different value, etc.

A "summary" of a data set refers to a representation of the data set as a whole. A summary of a data set can include data types of fields of the data set, statistical information for fields of the data set, and/or annotations of individual fields of the data set, a set of fields of the data set, or the data set as a whole. A "data health score" refers to any metric that characterizes the presence of data health issues in a data set. A "severity dictionary" is one or more indications of how severe a particular type of data health issue is when present in a data set. For instance, a severity dictionary can indicate that missing values are relatively more severe than statistical outliers, and can include weights designating the relative severity of each.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards. The term "user-specific model" refers to a model that has at least one component that has been trained or constructed at least partially for a specific user. Thus, this term encompasses models that have been trained entirely for a specific user, models that are initialized using multi-user data and tuned to the specific user, and models that have both generic components trained for multiple users and one or more components trained or tuned for the specific user. Likewise, the term "application-specific model" refers to a model that has at least one component that has been trained or constructed at least partially for a specific application.

The term "pruning" refers to removing parts of a machine learning model while retaining other parts of the machine learning model. For instance, a large machine learning model can be pruned to a smaller machine learning model for a specific task by retaining weights and/or nodes that significantly contribute to the ability of that model to perform a specific task, while removing other weights or nodes that do not significantly contribute to the ability of that model to perform that specific task. A large machine learning model can be distilled into a smaller machine learning model for a specific task by training the smaller machine learning model to approximate the output distribution of the large machine learning model for a task-specific dataset.

Example Decoder-Based Language Model

FIG. 1 illustrates an exemplary generative language model 100 that can be employed using the disclosed implementations. Generative language model 100 is an example of a machine learning model that can be used to perform one or more natural language processing tasks that involve generating text, as discussed more below. (Radford, et al., "Improving language understanding by generative pre-training," 2018). For the purposes of this document, the term "natural language" means language that is normally used by human beings for writing or conversation.

Generative language model 100 can receive input text 110, e.g., a prompt from a user. For instance, the input text can include words, sentences, phrases, or other representations of language. The input text can be broken into tokens and mapped to token and position embeddings 101 representing the input text. Token embeddings can be represented in a vector space where semantically-similar and/or syntactically-similar embeddings are relatively close to one another, and less semantically-similar or less syntactically-similar tokens are relatively further apart. Position embeddings represent the location of each token in order relative to the other tokens from the input text.

The token and position embeddings 101 are processed in one or more decoder blocks 102. Each decoder block implements masked multi-head self-attention 103, which is a mechanism relating different positions of tokens within the input text to compute the similarities between those tokens. Each token embedding is represented as a weighted sum of other tokens in the input text. Attention is only applied for already-decoded values, and future values are masked. Layer normalization 104 normalizes features to mean values of 0 and variance to 1, resulting in smooth gradients. Feed forward layer 105 transforms these features into a representation suitable for the next iteration of decoding, after which another layer normalization 106 is applied. Multiple instances of decoder blocks can operate sequentially on input text, with each subsequent decoder block operating on the output of a preceding decoder block. After the final decoding block, text prediction layer 107 can predict the next word in the sequence, which is output as output text 120 in response to the input text 110 and also fed back into the language model. The output text can be a newly-generated response to the prompt provided as input text to the generative language model.

Example Workflow

Figure 2:
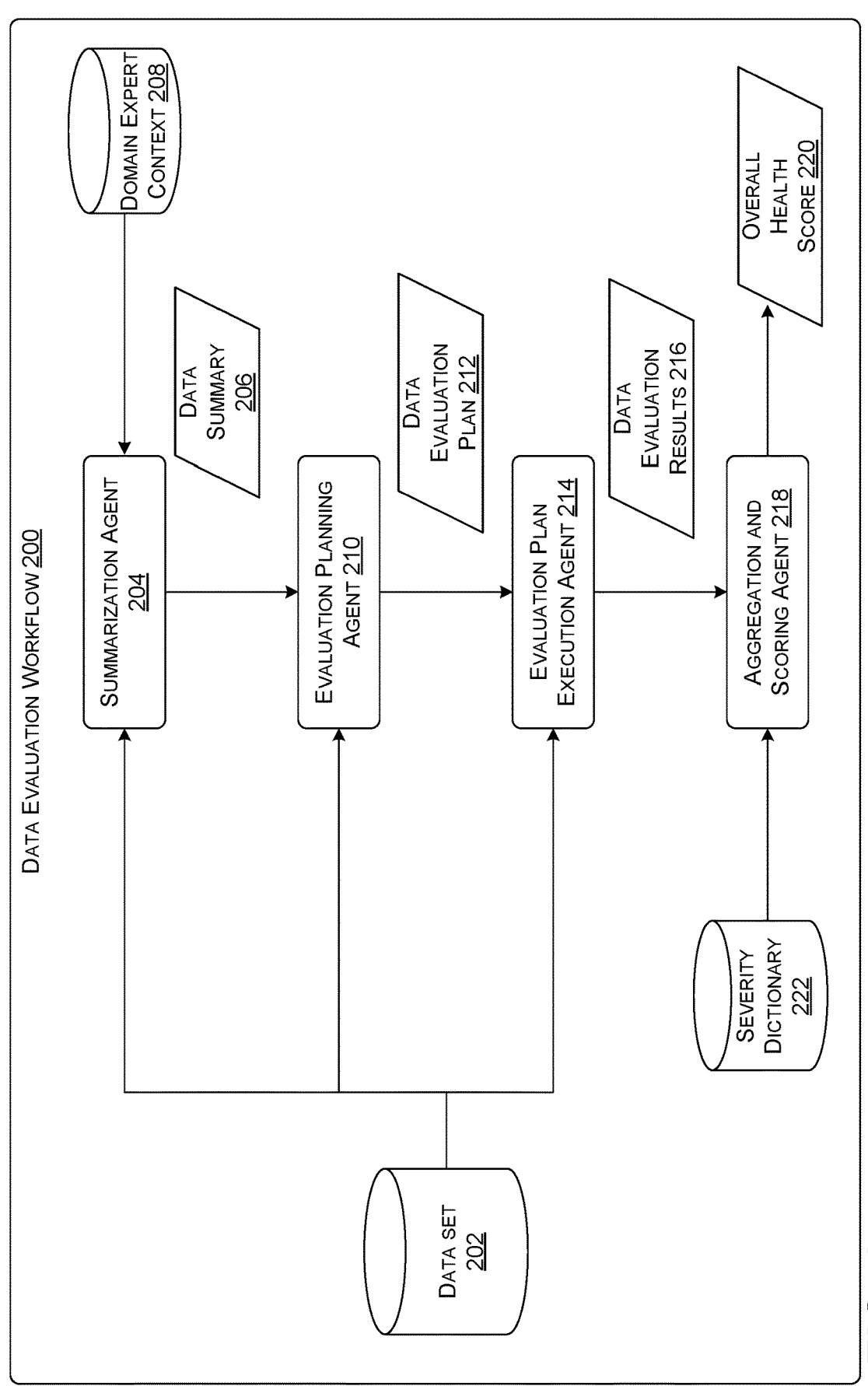
FIG. 2 illustrates an example workflow for data evaluation, consistent with some implementations of the present concepts.

FIG. 2 illustrates an example data evaluation workflow 200 that can incorporate a generative language model into evaluating a data set 202. In workflow 200, a series of automated agents can perform various interactions with the generative language model to accomplish a data evaluation and/or cleaning task.

The data set is input to summarization agent 204, which generates a data summary 206. For instance, the data summary can characterize the data set as a whole, and/or individual fields of the data set. In some cases, the data summary includes atomic data types of individual fields as well as statistics for certain fields, such as maximum values, minimum values, and/or number of unique values. The data summary can also include annotations obtained from a generative language model, such as a semantic description of the entire data set, semantic types of individual fields of the data set, and textual descriptions of individual fields of the data set. The annotations can be obtained by prompting the generative model to generate the annotations using information about the data set, such as the name of the data set, names of fields of the data set, and or selected values from the data set. In some cases, domain expert context 208 is also employed to generate the summary.

The data summary 206 is input to evaluation planning agent 210, which generates a data evaluation plan 212. For instance, the data summary can be provided to a generative language model as context with a prompt requesting a list of data evaluation actions for the data set 202. The generative language model can respond by generating different data evaluation actions to take for each field of the data set. For instance, the data evaluation actions can include testing for invalid values in the data set, testing for inconsistent formats in the data set, testing for inconsistent semantic types in the data set, testing for missing values in the data set, testing for outliers in the data set, testing for duplicate unique values in the data set (e.g., two different rows with the same primary key), or testing for inconsistent units in the data set.

The data evaluation plan 212 is input to evaluation plan execution agent 214, which generates data evaluation results 216. For instance, the evaluation plan execution agent can involve executing code that obtains samples from the data set and performs the data evaluation actions on the samples. In some cases, the code is written by a human developer. In other cases, the generative language model can prompted to generate the code, as described further below.

The data evaluation results are input to aggregation and scoring agent 218, which generates an overall health score 220 from the results. In some cases, a machine learning model (e.g., a regression model) is employed to determine the overall health score. In other cases, a severity dictionary 222 is employed. For example, the severity dictionary can include weights for different types of errors, and the overall score can be calculated based on a weighted sum over all of the errors identified in the data evaluation results 216.

Example Data Set Summary

Figure 3B:
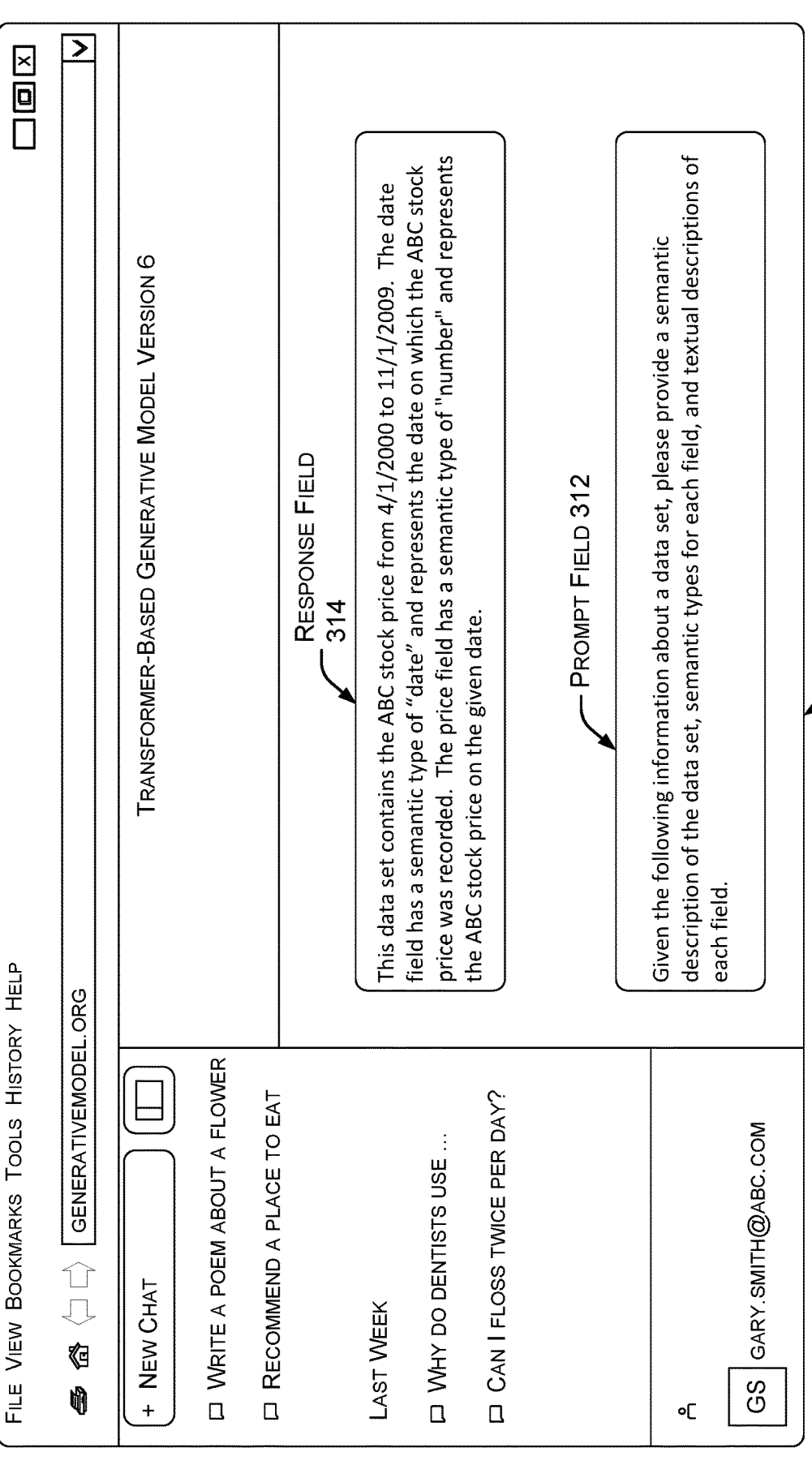
FIG. 3B illustrates an example of prompting a generative language model to generate annotations of a data set, consistent with some implementations of the present concepts.

FIG. 3A shows a table 300 with two columns, date 302 and price 304. Table 300 is one example of a data set that can be evaluated using data evaluation workflow 200. As noted above, summarization can involve determining data types of fields of the data set. For instance, the date column is a "date" data type, and the price column is a "number" data type. Summarization can also involve calculating statistics for different fields. For instance, the statistics can also include minimum values, maximum values, the number of unique values, etc.

In addition, summarization can include obtaining annotations from a generative language model. For instance, referring to FIG. 3B, generative language model interface 310 has a prompt field 312 and a response field 314. The generative language model can be prompted via prompt field 312 with a request such as "Given the following information about a data set, please provide a semantic description of the data set, semantic types for each field, and textual descriptions of each field." The data set itself (or values sampled therefrom) and/or the filename of the data set and the name of each field can be provided to the generative language model as context provided with the prompt. The statistics for any of the fields can also be provided as part of the prompt.

The generative language model can generate a description that is output via the response field 314. Here, the generative language model responds with "This data set contains the ABC stock price from Apr. 1, 2000 to Nov. 1, 2009. The date field has a semantic type of 'date' and represents the date on which the ABC stock price was recorded. The price field has a semantic type of 'number' and represents the ABC stock price on the given date." Because modern generative language models are trained on massive training data sets and can learn a wide range of concepts, modern generative language models are capable of recognizing the meaning of different fields of a dataset by reasoning over information such as names of the data set, names of fields of the data set, other metadata, and/or values present in the data set. Thus, the generative language model is able to provide annotations that distill the meaning obtained from these information sources into natural language annotations.

Note that interactions with a generative language model are described herein using a graphical user interface to convey certain concepts. However, in some implementations, a generative language model can be accessed programmatically, e.g., using one or more application programming interfaces, without necessarily involving a user interface. In other cases, the techniques described herein can be performed with a human "in the loop" at different times, in which case a graphical user interface can be employed for interacting with the generative language model. For the purposes of this document, all automated agents are assumed to operate without human intervention unless specifically noted elsewhere. Thus, the prompts shown herein can be provided to a generative language model programmatically and the generated responses can be received programmatically by the respective automated agents.

FIG. 3C shows data set summary 320, which includes descriptions of each field of the data set. Entries obtained via data type analysis or statistical calculations are shown in regular font, and entries obtained via annotations from the generative language model are shown in bold font. As described more below, the data set summary can provide information sufficient for a generative language model to generate a data evaluation plan for the data set.

Example Evaluation Plan Generation

Figure 4:
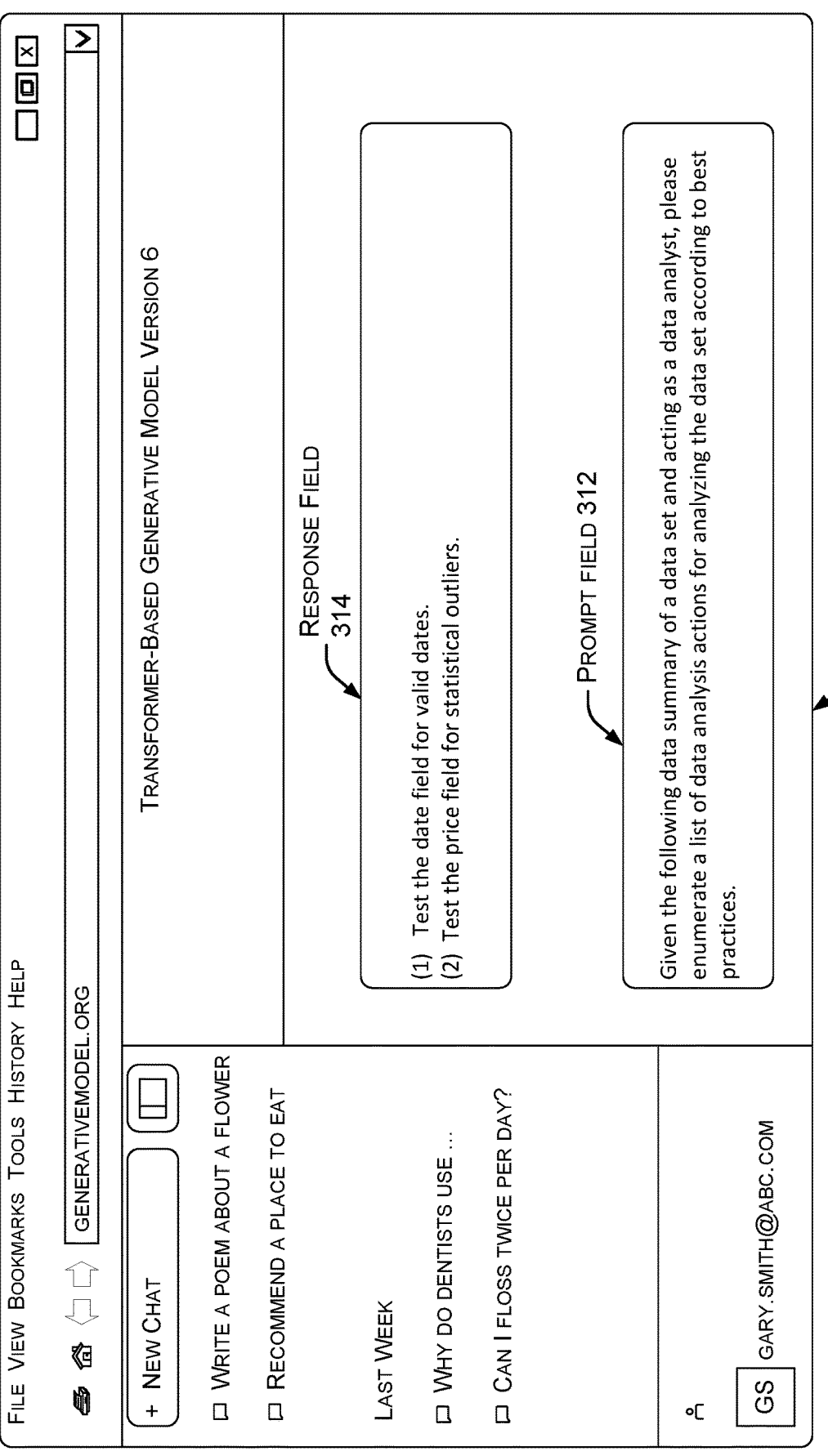
FIG. 4 illustrates an example of prompting a generative language model to generate a data analysis plan, consistent with some implementations of the present concepts.

FIG. 4 shows an example of how a generative language model can be prompted to generate a data evaluation plan. As shown in FIG. 4, the generative language model can be prompted with a query such as "Given the following data summary of a data set and acting as a data analyst, please enumerate a list of data analysis actions for analyzing the data set according to best practices." The query can be accompanied by the data summary that was previously generated as context, which can also be input to the generative language model. In response, the generative language model can generate a data evaluation plan.

Referring back to FIG. 3C, the data set summary 320 that is input to the generative language model with the query indicates that the data set includes date types as well as numeric types. In this case, the data evaluation plan generated by the generative language model includes two proposed data evaluation actions. The first data evaluation action involves testing the date field for valid dates. The second data evaluation action involves testing the price field for statistical outliers.

As noted previously, modern generative language models are trained on a very wide range of training data and as such are capable of reasoning on a broad range of topics. Here, a generative language model that has been trained on training data with natural language sentences indicating that date fields can have invalid dates could recognize that testing for valid dates is an appropriate data evaluation action for any data set having a date field. Likewise, a generative language model that has been trained on training data with natural language sentences indicating that number fields can have statistical outliers could recognize that testing for statistical outliers is an appropriate data evaluation action for any data set having a numerical field.

Example Evaluation Plan Execution

Figure 5A:
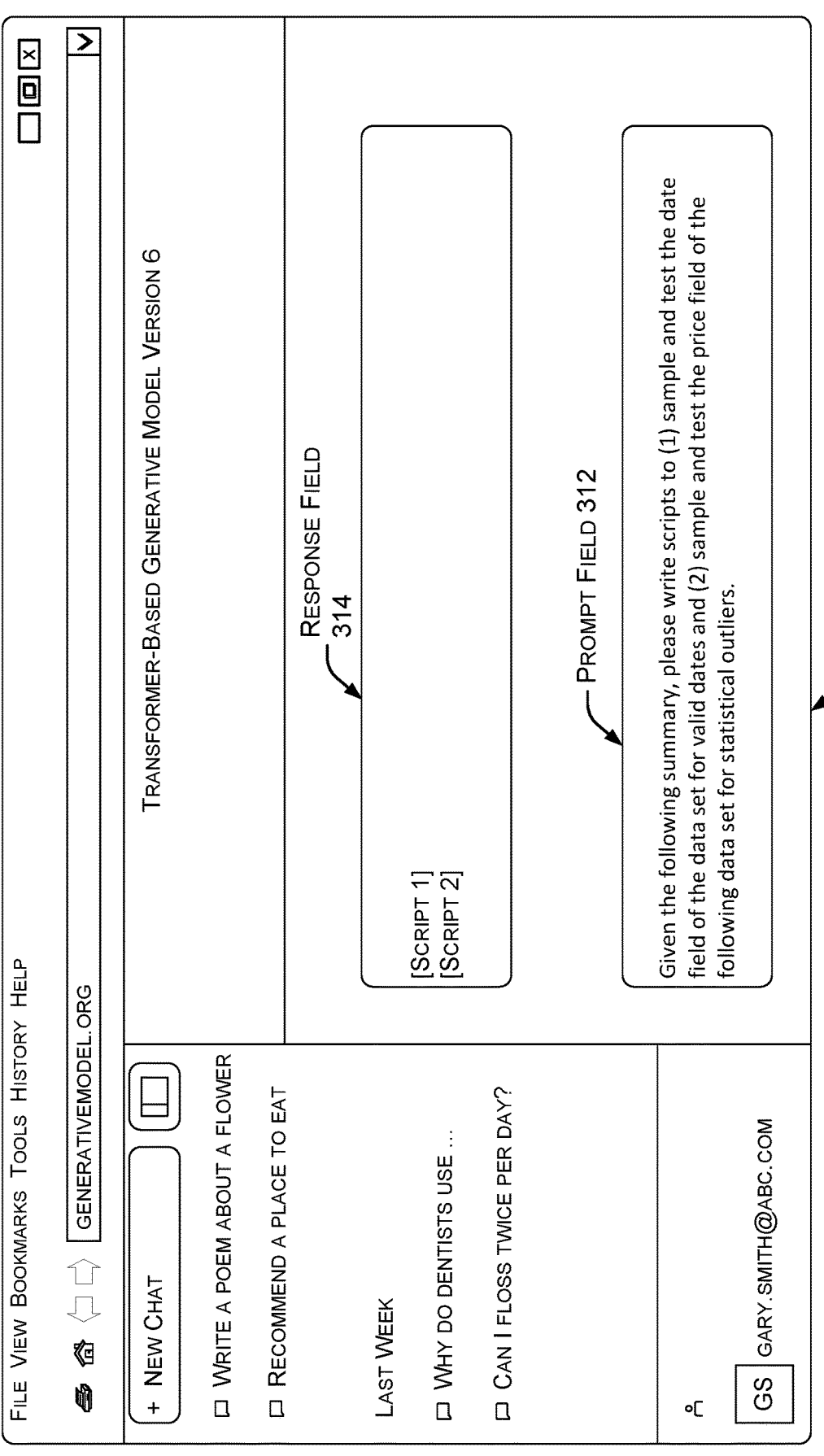
FIG. 5A illustrates an example of prompting a generative language model to generate code to implement data evaluation actions of a data evaluation plan, consistent with some implementations of the present concepts.

FIG. 5A shows an example of how a generative language model can be employed to generate code for implementing the data evaluation plan. For instance, the generative language model can be prompted with a query such as "Given the following summary, please write scripts to (1) sample and test the date field of the data set for valid dates and (2) sample and test the price field of the following data set for statistical outliers." The prompt can be provided with additional context such as data types of the fields. In response, the generative language model can generate two corresponding scripts having code that performs the requested data evaluation actions.

Modern generative language models have demonstrated the capability to write accurate code given a natural language prompt describing the desired functionality of the code. When a generative language model has seen enough training examples of code together with natural language descriptions of how the code functions, the generative language model can generate code to perform similar functions in different contexts. Thus, for instance, a generative language model that has been trained on training data showing code for testing the date field of a first data set can, given a description of a second data set, write code to test the date field of the second data set even though the generative language model has not been specifically trained on code written for the second data set.

FIG. 5B illustrates a data sample 510 that can be extracted by the first script. The first script could identify the value 4/31/2002 as an invalid date, since April does not have 31 days. In other words, the first script has identified a single data health issue in the first sample. FIG. 5C shows a data sample 520 that could be extracted by the second script. The second script could identify the values −124.27 and −340.23 as statistical outliers, as the only negative values in the sample. In other words, the second script has identified two data health issues in the second sample.

Figure 5D:
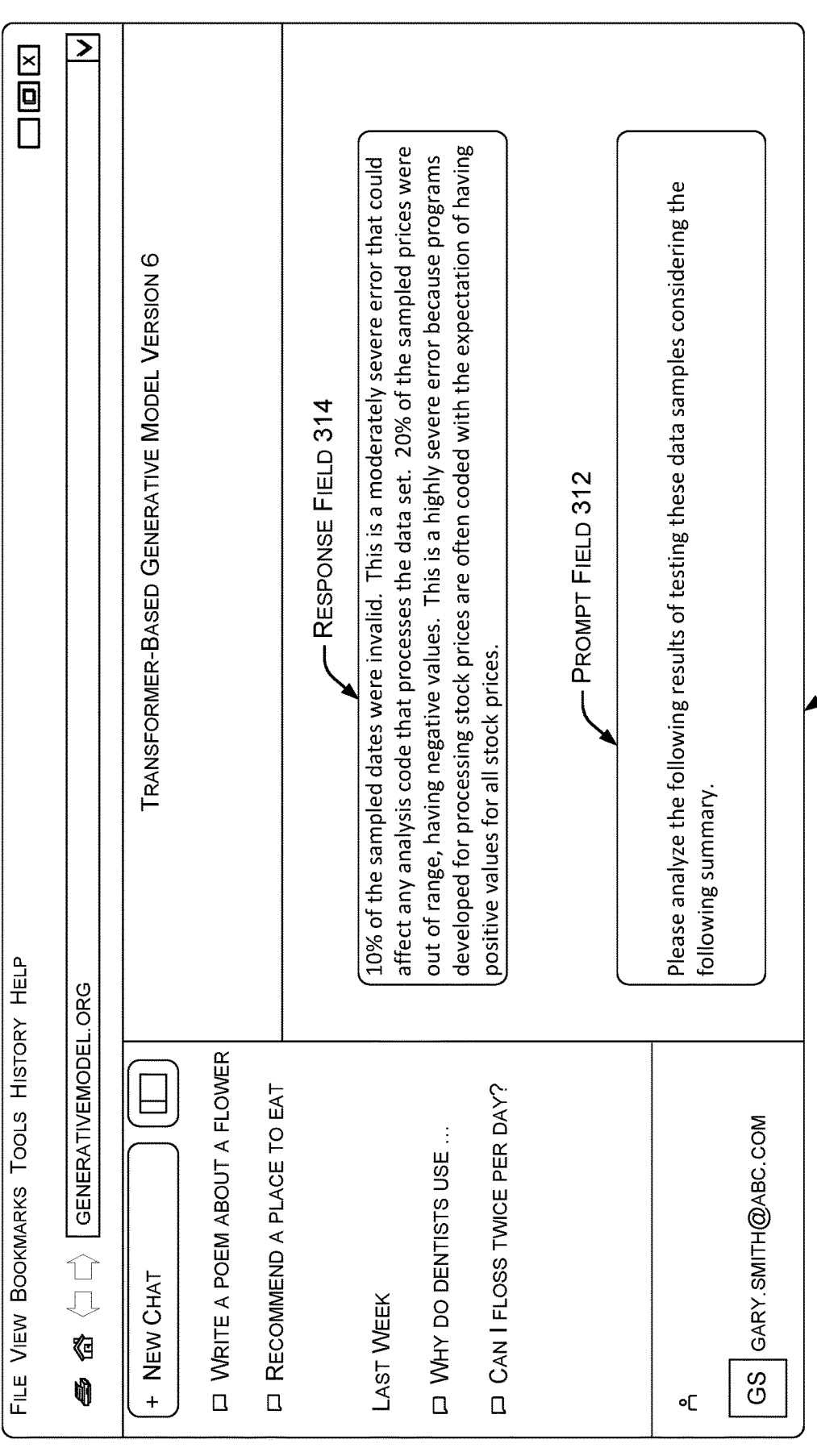
FIG. 5D illustrates an example of prompting a generative language model to generate an analysis of results of data evaluation actions, consistent with some implementations of the present concepts.

As shown in FIG. 5D, the outputs of the scripts can be provided to the generative language model for analysis as a prompt. For instance, a query such as "Please analyze the following results of testing these data samples given the following summary" can be input to the generative language model, together with the data health issues identified by the scripts as context. In response, the generative language model can generate a response such as "10% of the sampled dates were invalid. This is a moderately severe error that could affect any analysis code that processes the data set. 20% of the sampled prices were out of range, having negative values. This is a highly severe error because programs developed for processing stock prices are often coded with the expectation of having positive values for all stock prices."

Here, a generative language model that has been trained using natural language characterizing the severity of data health issues can reason over the input test results to determine the severity of the identified health issues. For example, the generative language model may have seen training data such as an email from one developer to another that "We've got some invalid dates in the sales spreadsheet, this will probably cause us some problems but we should move forward with the presentation." Given enough examples of this type of natural language statement could allow the generative language model to infer that invalid dates are moderately problematic. Similarly, the generative language model may have seen training data with natural language statements characterizing the presence of negative values in fields that should only have positive values as very serious errors. For instance, the generative language model may have seen sentences such as "These negative prices for ZZZ stock are going to crash our trading platform!!" Training on sentences such as these allows the generative language model to infer that the negative values in the price field are likely to be very serious errors.

In some cases, evaluation plan execution can also involve performing one or more data cleaning actions. For instance, data cleaning actions can involve executing code that attempts to correct individual errors. For instance, a prompt could be provided to a generative language model requesting code to "Correct any invalid dates in this dataset." The generative language model could generate a script that removes all entries (e.g., rows) with invalid dates from the data set.

However, data cleaning actions may not necessarily improve the health of a given data set, depending on various factors. For instance, given a data set of stock prices, it may be better to simply delete any entries with an invalid date, since it is impossible for a stock to have had a given price on that date and there are other valid dates in the data set with valid prices. On the other hand, consider a data set of students in a given high school class, where each student is an entry in the data set and a date field represents their birthday. The data set could have other valuable information about the student, such as gender, interests, special needs, etc. In this case, it might be preferable to perform a different data cleaning action than deleting the student from the data set. For instance, the data cleaning action could involve entering a flag such as "INVALID" into the data set. This might prompt a teacher to ask the student their birthday and ultimately facilitate a better resolution that deleting the entry.

In some cases, evaluation plan execution can involve attempting various data cleaning actions, testing the results, and iteratively continuing this process until a final set of data cleaning actions is identified. For instance, if the first data cleaning action recommended by a generative language model involved removing a student from a data set, the generative language model might be able to detect that the results of this action are problematic after being prompted with results from the first data cleaning action, e.g., if the data set also lists the total number of students and the total number is incorrect after performing the deletion. The generative language model might indicate that data health of the data set has been hurt by deleting the student. Subsequently, after replacement of the invalid birth date with the "INVALID" flag and being prompted with the results of this data cleaning action, the generative language model might indicate that the data health of the data set is improved compared to having the invalid birth date field. More generally, the ability of generative language models to reason over complex data relationships allows for iterative generation and testing of data cleaning actions that are appropriate for the data set, given context such as a summary of the data set and/or results of performing individual data cleaning actions.

Example Aggregation and Scoring

Given the results of the scripts and/or the textual description of the results provided by the generative language model, an overall health score can be calculated. If data cleaning actions that change the data set were performed, the health score can be computed for both the original data and the data after the cleaning actions were performed. If only data evaluation actions that did not change the data were performed, then a single overall score can be computed.

In some cases, the overall health score can be computed using a weighted function of the errors identified when the evaluation plan is executed. For instance, weights can be assigned to each type of error, and then a weighted sum can be calculated for each error. The weighted sum can be employed as a penalty to calculate a normalized health score between 0 and 100, where 100 represents data with no errors and 0 represents completely corrupted data.

In other cases, a regression model can be trained to map results of the scripts into a health score. For instance, a regression model can be trained with training data sets and corresponding error results having health scores as labels. The regression model can map the results of the evaluation plan to a health score for the data set being evaluated.

Figure 6:
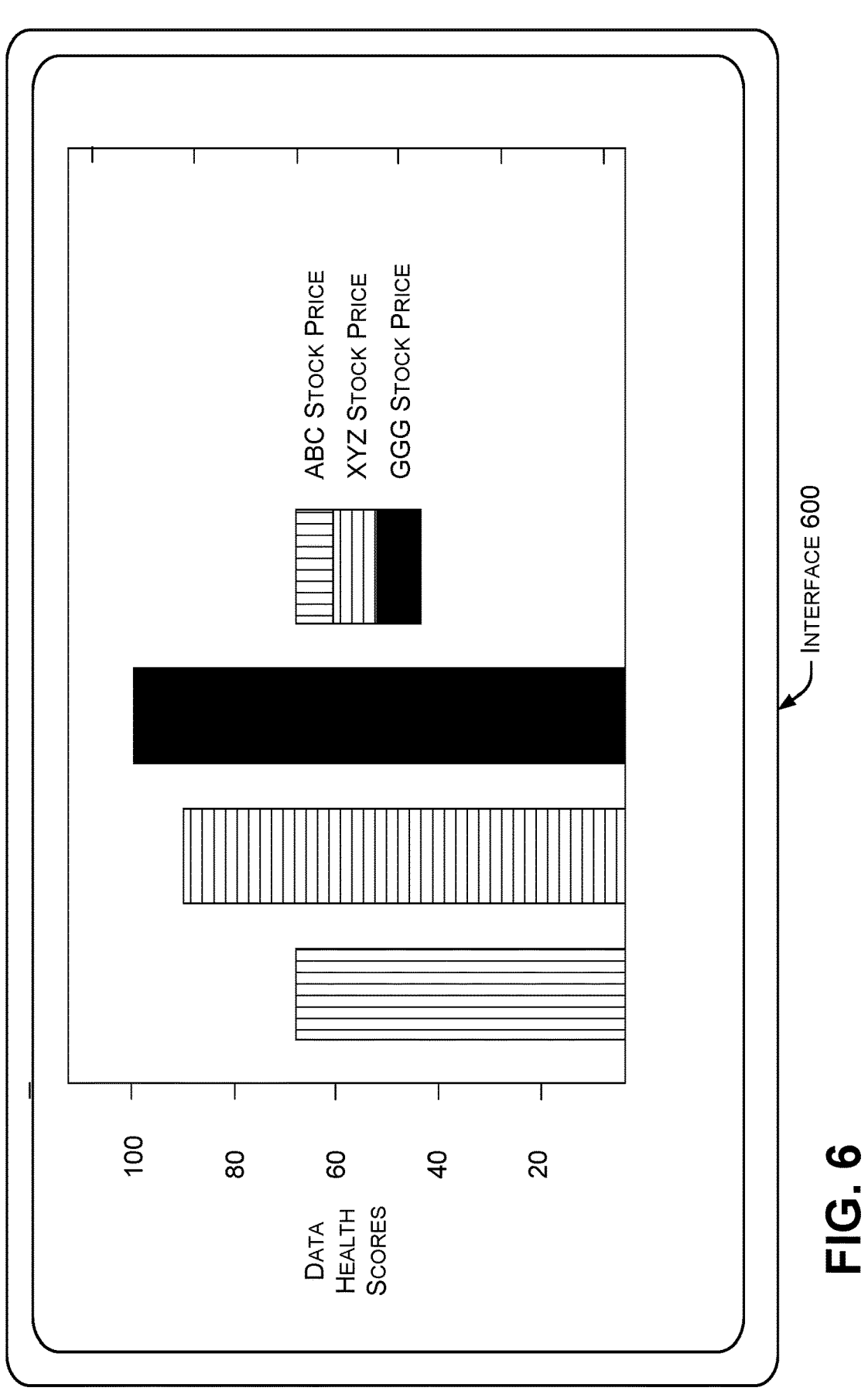
FIGS. 6 and 7 illustrate example graphical user interfaces that can be employed to convey data health, consistent with some implementations of the present concepts.

In some cases, aggregation and scoring can also involve generating visualizations representing the health of individual data sets. For instance, FIG. 6 shows an interface 600 having a bar chart with data health scores for three different data sets. The ABC stock price data set has a health score of approximately 70, the XYZ stock price data set has a health score of approximately 90, and the GGG stock price data set has a health score of nearly 100.

In some cases, users can also be presented with visualizations that provide more detail on the errors in a given data set. For instance, assume a user clicks the bar for ABC stock price in interface 600. The user can be presented with

Figure 7:
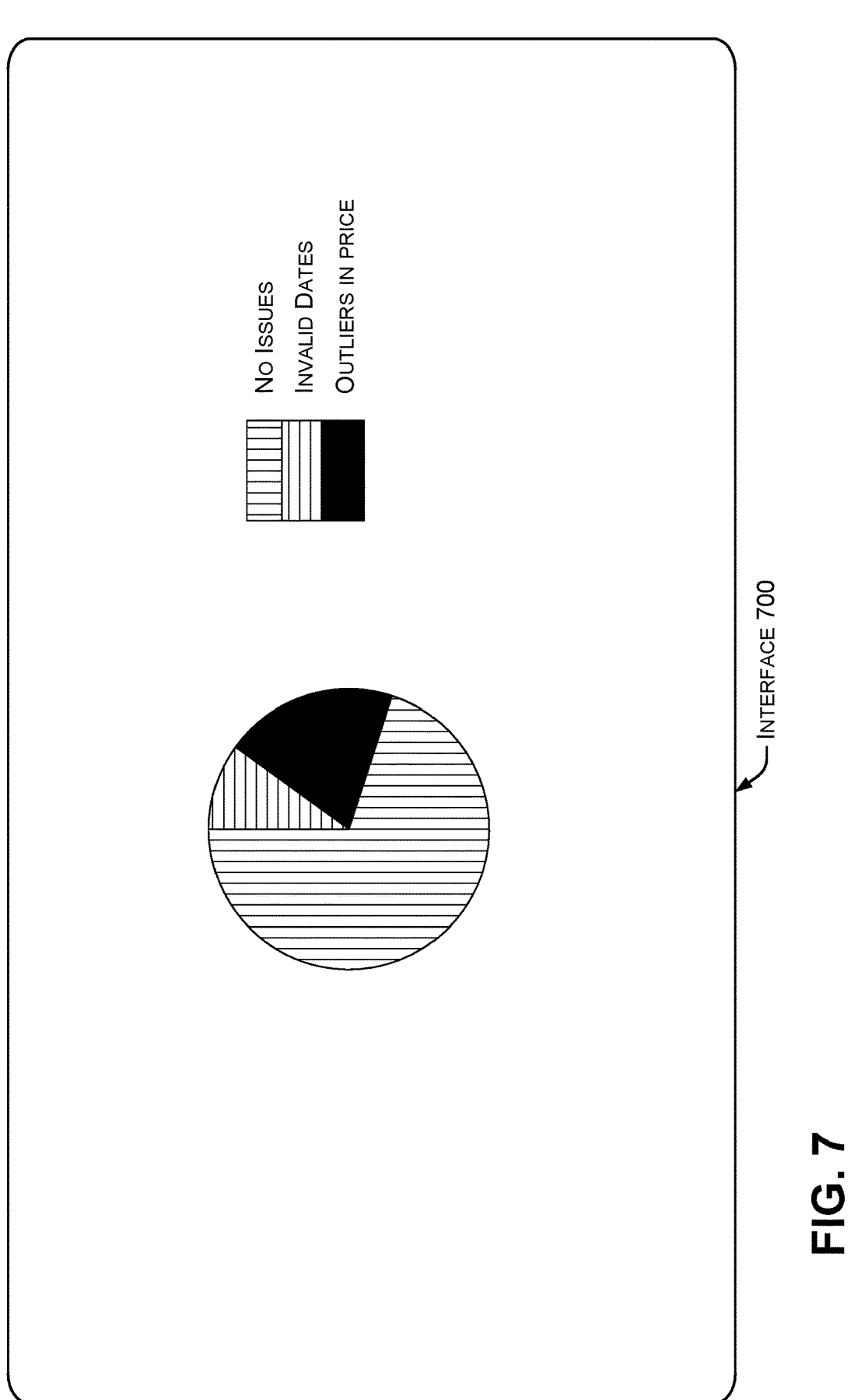

11 another interface 700, shown in FIG. 7. Interface 700 shows a more detailed view of the data health issues in the ABC stock price data set. Here, approximately 70% of the data has no health issues. 10% of the dates in the data set are invalid, and 20% of the prices are outliers.

Example System

Figure 8:
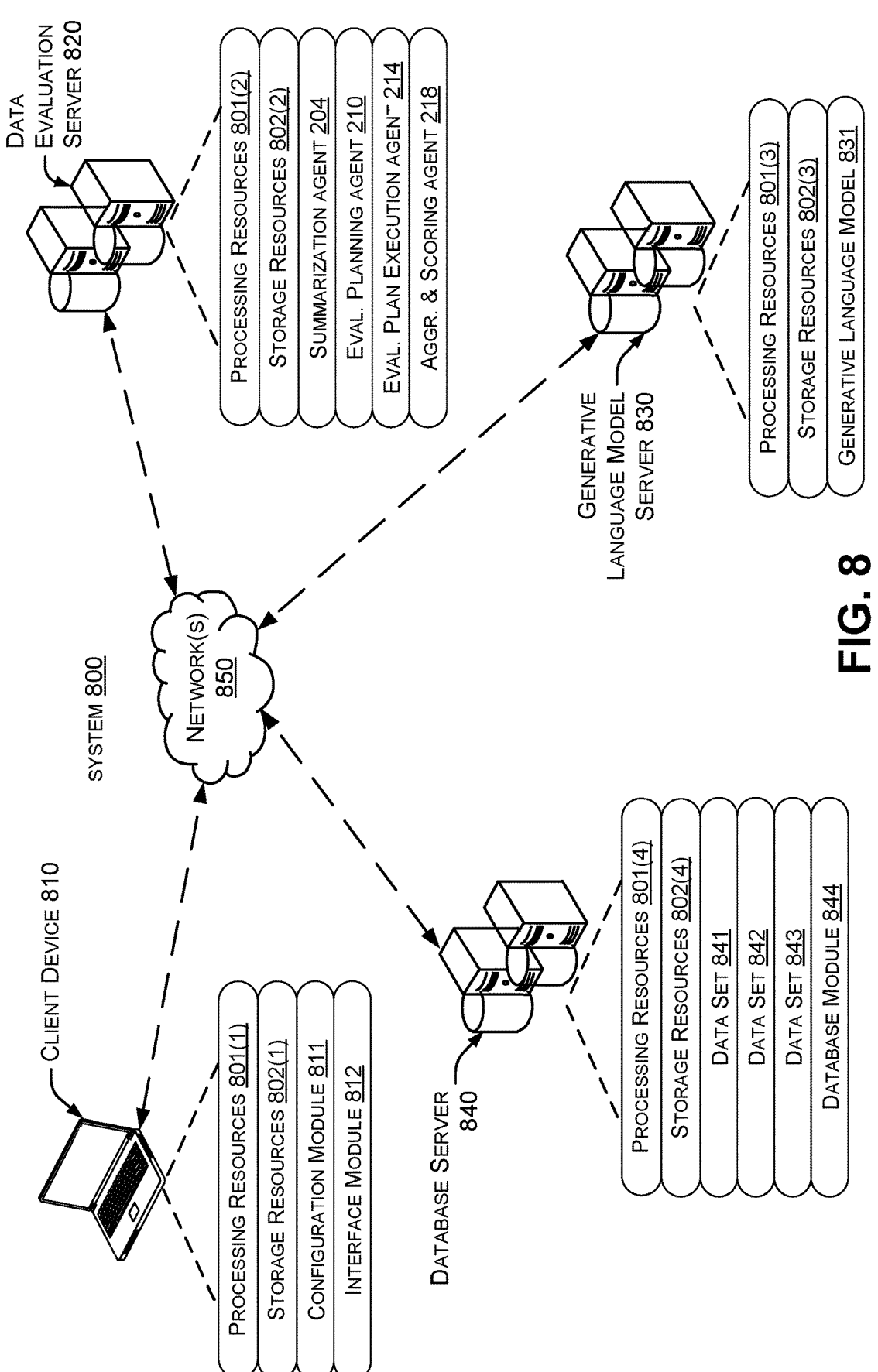
FIG. 8 illustrates an example system, consistent with some implementations of the present concepts.

The present implementations can be performed in various scenarios on various devices. FIG. 8 shows an example system 800 in which the present implementations can be employed, as discussed more below.

As shown in FIG. 8, system 800 includes a client device 810, a data evaluation server 820, a generative language model server 830, and a database server 840, connected by one or more network(s) 850. Note that the client device can be embodied both as mobile devices such as smart phones or tablets, as well as stationary devices such as desktops, server devices, etc. Likewise, the servers can be implemented using various types of computing devices. In some cases, any of the devices shown in FIG. 8, but particularly the servers, can be implemented in data centers, server farms, etc.

Certain components of the devices shown in FIG. 8 may be referred to herein by parenthetical reference numbers. For the purposes of the following description, the parenthetical (1) indicates an occurrence of a given component on client device 810, (2) indicates an occurrence of a given component on data evaluation server 820, (3) indicates an occurrence on generative language model server 830, and (4) indicates an occurrence on database server 840. Unless identifying a specific instance of a given component, this document will refer generally to the components without the parenthetical.

Generally, the devices 810, 820, 830, and/or 840 may have respective processing resources 801 and storage resources 802, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 810 can include a configuration module 811 that can interact with various modules on data evaluation server 820. Generally speaking, the configuration module can provide certain configuration parameters to the data evaluation server for evaluating one or more data sets. For instance, the configuration parameters can identify a data set that data evaluation server 820 should process, any domain expert context information describing the data set, a severity dictionary indicating weights for different types of errors, etc. Client device 810 can also include an interface module 812, which can be employed to interact with visualizations representing data evaluation by the data evaluation server.

Data evaluation server 820 can obtain the identified data set from database server 840, and process the identified data set with summarization agent 204, evaluation planning agent 210, evaluation plan execution agent 214, and aggregation and scoring agent 218. The summarization agent can generate a summary of a given data set such as shown in FIG. 3C. The summarization agent can analyze atomic data types in a given data set and include the atomic data types in the summary. The summarization agent can also employ expert domain context for populating the summary. The summarization agent can also prompt the generative language model 831 on generative language model server 830 to generate annotations to include in the summary.

The evaluation planning agent 210 on data evaluation server 820 can determine a data evaluation plan having one or more data evaluation actions. For instance, the evaluation planning agent can prompt to the generative language model 831 requesting a data evaluation plan. The prompt can be provided to the generative language model with context, such as the data summary produced by the summarization agent.

The evaluation plan execution agent 214 on data evaluation server 820 can execute each data evaluation action in the data evaluation plan. For instance, the evaluation plan execution agent can receive code that implements the data evaluation plan via user input, and execute the code. In other cases, the evaluation plan execution agent can prompt the generative language model 831 to write code to implement the data evaluation plan, and execute the code. In still further cases, the code is initially generated by the generative language model but then revised or tested by a user prior to being executed. The code can obtain samples (e.g., rows) from different fields (e.g., columns) of the data set and test for various errors. For instance, the code can perform testing for one or more of invalid values in the samples, testing for inconsistent formats in the samples, testing for inconsistent semantic types in the samples, testing for missing values in the samples, testing for outliers in the samples, testing for duplicate unique values in the samples, or testing for inconsistent units in the samples.

The aggregation and scoring agent 218 on data evaluation server 820 can obtain results of the data evaluation plan and determine an aggregate health score for the data set. As noted previously, a regression model can be employed, or in other cases a weighted sum can be used to determine the overall severity of errors in a given data set. For instance, a multiplier of 1 might be employed for each formatting error, a multiplier of 3 for each invalid value, etc. The weighted sum can be normalized and converted into an aggregate health score. The aggregation and scoring agent can also generate one or more visualizations representing results of the data evaluation plan. The visualizations can be sent from the data evaluation server 820 to client device 810 for display by interface module 812.

Note that different data evaluation plans can be performed on different data sets. For instance, database server 840 can store data set 841, 842, and 843. The data sets can be accessed via database module 844, e.g., a database management system. The data sets may have different field names, values, etc. As a consequence, the summary generated for each data set will be different, and the data evaluation plan for each data set can also be different. For instance, if one of the data sets lacks any numerical values, then the generative language model may not recommend testing for outliers on that data set. As another example, if only one of the data sets includes dates, then the generative language model may only recommend testing for out of range dates on that particular data set.

Example Method

Figure 9:
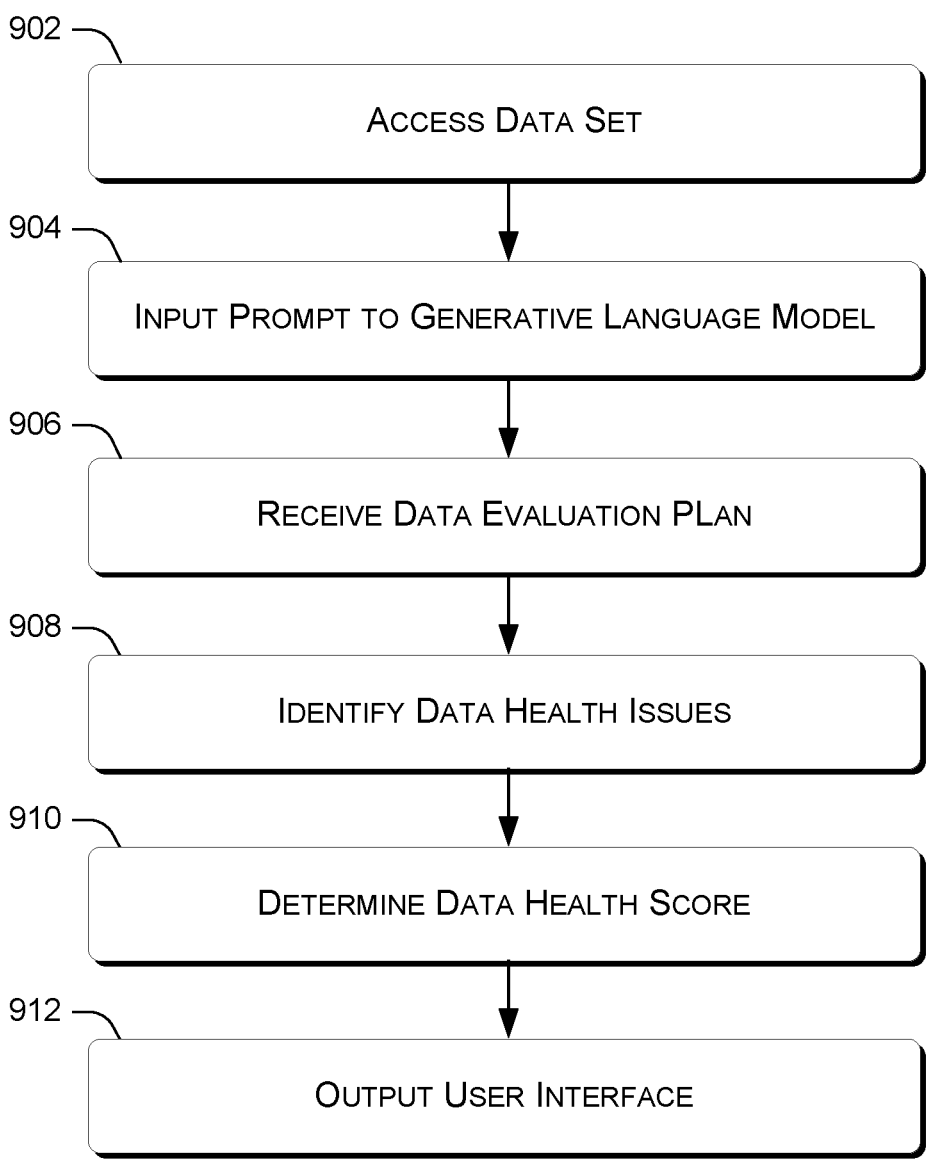
FIG. 9 illustrates an example method or technique for data evaluation employing a generative language model, consistent with some implementations of the present concepts.

FIG. 9 illustrates an example method 900, consistent with the present concepts. As discussed more below, method 900 can be implemented on many different types of devices, e.g., by one or more cloud servers, by a client device such as a laptop, tablet, or smartphone, or by combinations of one or more servers, client devices, etc.

Method 900 begins at block 902, where a data set is accessed. For instance, the data set can be one or more tables from a relational database, a spreadsheet, a .csv or spreadsheet file, a .json file, etc. In some cases, the data is received over a network, e.g., by data evaluation server 820 retrieving data from database server 840.

Method 900 continues at block 904, where a prompt regarding the data is input to a generative language model. For instance, as described above, the prompt can request that the generative language model generate one or more data evaluation actions. Collectively, the data evaluation actions can make up a data evaluation plan. The prompt provided to the generative language model can include a summary of the data set as context.

Method 900 continues at block 906, where the data evaluation plan generated by the generative language model is received. The data evaluation plan generated by the generative language model can be conditioned on the summary that was provided as context with the data set. In this way, the generative language model can generate data evaluation plans that are customized or tailored for individual data sets.

Method 900 continues at block 908, where data health issues are identified. For instance, as noted above, the data evaluation actions can be performed by executing user-generated code and/or code generated by the generative language model. The results of executing the code can identify various data health issues in samples taken from the data set. In other cases, data from the data set can be input to the generative language model with a prompt, and the generative language model can identify data health issues directly by analyzing the data, without generating code to do so.

Method 900 continues at block 910, where the data evaluation results are aggregated to determine a data health score. As noted previously, weights from a severity dictionary can be employed to calculate a weighted sum that is used to derive a data health score, and/or a machine-trained regression model can determine the data health score. In cases where data cleaning actions are performed, the data health score can be determined for the original data as well as the cleaned data, to convey the extent to which the data cleaning actions improved the health of the original data set.

Method 900 continues at block 912, where one or more user interfaces can be output. For instance, one or more graphical user interfaces conveying health of the data set can be generated. The graphical user interfaces can also convey information regarding specific types of errors present in samples taken from individual fields of the data set.

Alternative Implementations

The examples provided above are intended to convey certain concepts, but the concepts described herein are not limited to the examples provide above. For instance, there are many other ways in which a generative language model can be employed to evaluate and/or clean a data set besides those specifically described above. In addition, there are many different ways that a data health score can be calculated.

For instance, the examples above described handling invalid dates by either deleting entries having invalid dates or adding flags to those fields indicating the date for a given entry is invalid. In other cases, it may be more appropriate to correct an invalid date by choosing the nearest valid date, e.g., April 31 could be corrected to April 30 or May 1. As another example, instead of deleting entries with statistical outliers, data could be cleaned by interpolating between the two adjacent valid values in the data set and replacing the outliers with the interpolated values. This might be sensible, for example, for home values, which do not tend to fluctuate on a day-to-day basis. This might be less sensible for a stock price, which could be far more volatile than home values. Modern generative language models are capable of recognizing that home prices do not fluctuate as rapidly as stock prices and are thus capable of articulating different data cleaning actions accordingly.

As another example, consider two data sets with an "age" field. The first data set is for a list of registered voters, and the second data set is for a list of high school students. Further, consider a generative language model that recognizes the meaning of other fields in the data set (e.g., "voter ID" field in the first data set and "grade level" in the second data set). The generative language model can annotate the summary for each data set accordingly. When the generative language model is prompted to generate data evaluation plans for each data set, the generative language model can take into account the annotations. For instance, the generative language model may generate a data evaluation action that tests for ages below the age of 18 for the registered voter data set, because many states have laws requiring that voters are at least 18 years of age. However, this test is not sensible for high school students. Instead, the generative language model might generate a different data evaluation action that tests the age field of the student data set for values appropriate for high school students (e.g., 14-18)

In a similar vein, a generative language model might recognize different severities for outlying values in these two data sets. A voter who is 17 and cannot legally vote might be considered a very severe error, and the generative language model may recognize as much by having been trained on natural language sentences indicating that it is illegal for people under the age of 18 to vote. On the other hand, occasionally older or younger students might attend high school, e.g., some students may skip grades and be younger than the standard high school age range, or need an extra year to finish high school due to health issues, etc. Thus, the generative language model might recognize that an out-of-range age is a less severe error for a high school student data set than a registered voter data set. The resulting health score for each data set can reflect this, with the voter data set being penalized more heavily than the student data set for out-of-range ages.

Despite the tremendous capabilities of modern generative language models, there are some things that modern generative language models simply cannot know, because they have not been trained on appropriate data. For instance, consider a scenario where a legislator from a legislative body wishes to understand the likely political outcomes of changing the voting age from 18 to 16. A generative language model does not inherently "know" what the legislator is trying to do, and the vast majority of training data for a general-purpose model will likely indicate that voting ages below 18 are serious errors. This is an instance where domain context can be useful, e.g., the summary of the voter data set could be annotated to state that "ages 16 and over are acceptable" by the legislator or a member of their team. Then, the generative language model could generate a data evaluation plan that looks for ages below 16 instead of 18 as out-of-range errors that are problematic.

Technical Effect

Conventionally, data scientists manually inspect data to identify issues in the data and then take corrective actions.

However, not only is this approach laborious and time-consuming, it can be error-prone. When human experts incorrectly diagnose data health issues or their attempts to correct data health issues fail, the results can be catastrophic.

Recent advances in language modeling have resulted in generative language models that can learn vast amounts of information, to the point where generative language models can even achieve tasks such as passing the bar exam. The disclosed techniques can leverage these capabilities of modern generative language models to automate data analysis and cleaning. As noted above, for instance, generative language models can be employed to summarize data, identify specific data health issues in data samples, plan corrective actions for a given data set, and also generate code to fix the identified issues. All of this can be performed in an automated fashion that reduces or eliminates dependencies on error-prone manual techniques.

Note that there are technical limitations of generative language models that can be overcome by the disclosed techniques. For instance, generative models often have input character limits, e.g., some generative models are limited to 4 k, 8 k, 32 k, or 64 k input characters. Thus, for larger data sets, it is not necessarily feasible to input the entire data set for analysis by a generative language model. The disclosed implementations can overcome these memory limitations by breaking a data evaluation or cleaning task down into a series of smaller subtasks that can be performed by respective automated agents. Each agent has its own defined role in the overall task, and can perform that role by using smaller prompts of the generative model that fit within the memory limits of the model.

For instance, the summarization agent 204 can generate a summary of a data set using statistics, data types, field or data set names, and model-generated annotations. The annotations themselves can be generated by the generative language model based on the statistics, data types, and/or field or data set names, without necessarily inputting the entire data set into the generative language model. Thus, the generative model can produce the annotations using information that fits within the model's memory limit.

Similarly, the evaluation planning agent 210 can use the summary generated by the summarization agent as context for a subsequent prompt to generate a data evaluation plan. Again, the generative language model does not necessarily need the entire data set as context. Rather, the summary, including the annotations previously generated by the generative language model, provide sufficient context for the generative language model to generate appropriate data evaluation actions.

Furthermore, the evaluation plan execution agent 214 can use the summary (including the annotations generated by the generative language model) and the data evaluation actions generated by the generative language model as context for requesting code to implement the data evaluation actions. The prompt fits within the memory limits of the generative language model yet generates code that can test the data set as a whole. Further, because the code tests samples of the data set rather than necessarily testing every entry in the data set, the results of executing the code can fit within the memory limit of the generative language model and the aggregation and scoring agent 218 can leverage the generative language model without exceeding its memory limits.

As noted above, breaking a data evaluation or cleaning task down into respective subtasks that can be performed by different automated agents has the technical benefit of allowing each of the subtasks to be performed without exceeding the memory capabilities of the generative language model. In addition, there are other benefits to doing so. In some cases, not only does each individual prompt fit within the memory limits of the generative language model, the entire series of prompts can fit within the memory limits. Thus, for example, the generative language model can attend on embeddings from previous prompts and responses, e.g., in masked multi-head self-attention layer 103 (FIG. 1). As a consequence, for example, the generative language model can consider both the prompts and responses for previously-executed agents when responding to prompts by subsequently-executed agents.

In some sense, the disclosed techniques can be viewed as a type of chain-of-thought prompting. Each agent performs a distinct part of the larger data evaluation or cleaning task. The generative language model is not asked to evaluate or clean a data set in a single step. Rather, the overall task is broken down into discrete steps where additional information, such as data types, field names, statistics, etc., are used to seed the initial summary generation and leveraged in subsequent prompts. This helps the model reason sequentially in a manner that enables the model to produce responses that are appropriately tailored to the characteristics of the individual data set being evaluated and/or cleaned.

In addition, the disclosed techniques can save computing resources such as processor cycles and/or memory when performing data cleaning actions. For instance, when a data set has many entries with invalid fields, it may be beneficial to simply delete those entries prior to performing intensive data analysis operations on the data set. By doing so, fewer entries need to be processed using processor cycles and memory. By tailoring the data evaluation plan to the data set using a generative language model, it is likely that these entries can be deleted safely without impacting the subsequent data analysis. As another example, when a data set has a statistical outliers, this can cause sorting or data binning routines to rearrange a large number of data items, which in turn uses processor and memory resources that could be preserved by removing these values or replacing them with interpolated values.

Device Implementations

As noted above with respect to FIG. 8, system 800 includes several devices, including a client device 810, a server 820, a server 830, and a client device 840. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 850. Without limitation, network(s) 850 can include one or more local area networks (LANs), wide area networks (WANs), the Internet, and the like.

Additional Examples

Various examples are described above. Additional examples are described below. One example includes a method performed on a computing device, the method comprising accessing a data set, using an automated evaluation planning agent, inputting a prompt to generate a data evaluation plan for the data set to a generative language model, the prompt including context describing the data set, receiving the data evaluation plan generated by the generative language model, and identifying one or more data health issues in the data set by performing the data evaluation plan using an automated evaluation plan execution agent.

Another example can include any of the above and/or below examples where the one or more data health issues include one or more of invalid values in the data set, inconsistent formats in the data set, inconsistent semantic types in the data set, missing values in the data set, outliers in the data set, duplicate unique values in the data set, or inconsistent units in the data set.

Another example can include any of the above and/or below examples where the method further comprises generating a summary of the data set and inputting the summary of the data set to the generative language model as the context describing the data set.

Another example can include any of the above and/or below examples where the method further comprises, by an automated summarization agent, prompting the generative language model to generate one or more annotations for the data set using a name of the data set, a name of a field of the data set, or values in the data set as context, receiving the one or more annotations for the data set from the generative language model, and including the one or more annotations in the summary, wherein the one or more annotations produced by the generative language model are employed as context for generating the data evaluation plan.

Another example can include any of the above and/or below examples where the annotations include a semantic description of the data set produced by the generative language model, semantic types of fields of the data set produced by the generative language model, and textual descriptions of the fields produced by the generative language model.

Another example can include any of the above and/or below examples where the method further comprises by an automated aggregation and scoring agent, determining a data health score for the data set based at least on the one or more data health issues.

Another example can include any of the above and/or below examples where the data health score is determined by the automated aggregation and scoring agent using at least one of a severity dictionary or a regression model.

Another example can include any of the above and/or below examples where the method further comprises, by the automated evaluation plan execution agent, prompting the generative language model to write code to implement one or more data evaluation actions of the data evaluation plan, receiving the code from the generative language model, and executing the code to implement the data evaluation plan.

Another example can include any of the above and/or below examples where the code written by the generative language model obtains samples from the data set and performs the one or more data evaluation actions of the data evaluation plan on the samples.

Another example can include any of the above and/or below examples where the code performs one or more data cleaning actions on the data set.

Another example can include any of the above and/or below examples where the one or more data cleaning actions include removing values from the data set or changing values in the data set.

Another example can include any of the above and/or below examples where the method further comprises, by the automated evaluation plane execution agent, prompting the generative language model to determine whether the one or more data cleaning actions improve data quality of the data set and responsive to a response from the generative language model indicating that a particular data cleaning action does not improve the data quality of the data set, performing a different data cleaning action on the data set.

Another example can include any of the above and/or below examples where the generative language model comprises a transformer decoder.

Another example can include any of the above and/or below examples where the method further comprises performing pruning or distillation on another generative language model having another transformer decoder to obtain the generative language model, the generative language model having fewer parameters than the another generative language model.

Another example can include a system comprising a hardware processing unit and a storage resource storing computer-readable instructions which, when executed by the hardware processing unit, cause the system to access a data set, input a prompt to a generative language model to generate a data evaluation plan for the data set, the prompt including a summary of the data set as context, receive the data evaluation plan from the generative language model, the data evaluation plan including one or more data evaluation actions, and perform the one or more data evaluation actions received from the generative language model to identify one or more data health issues in the data set.

Another example can include any of the above and/or below examples where the computer-readable instructions, when executed by the hardware processing unit, cause the system to prompt the generative language model for annotations of the data set and include the annotations from the generative language model with the prompt to generate the data evaluation plan.

Another example can include any of the above and/or below examples where the annotations include a semantic description of the data set produced by the generative language model, semantic types of fields of the data set produced by the generative language model, and textual descriptions of the fields produced by the generative language model.

Another example can include any of the above and/or below examples where the computer-readable instructions, when executed by the hardware processing unit, cause the system to include, in the summary included as context in the prompt, at least data types of fields of the data set and statistics for a particular field of the data set.

Another example can include any of the above and/or below examples where the statistics include a minimum value, maximum value, and number of unique values of the particular field.

Another example can include a computer-readable storage medium storing computer-readable instructions which, when executed by a processing unit, cause the processing unit to perform acts comprising accessing a data set, inputting a prompt to generate a data evaluation plan for the data set to a generative language model, the prompt including context describing the data set, receiving the data evaluation plan produced by the generative language model, and identifying one or more data health issues in the data set by performing the data evaluation plan.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   accessing a data set;
   by an automated evaluation planning agent:
      generating a prompt requesting generation of a data evaluation plan for the data set, the prompt having context describing the data set;
      invoking an application programming interface that provides the prompt to a generative language model; and
      receiving, via the application programming interface, the data evaluation plan generated by the generative language model;
      invoking the application programming interface with another prompt instructing the generative language model to write code to implement one or more data evaluation actions of the data evaluation plan;
      receiving the code from the generative language model; and
      executing the code to implement the data evaluation plan, the executing identifying one or more data health issues in the data set by performing the one or more data evaluation actions.

2. The method of claim 1, wherein the one or more data health issues include one or more of invalid values in the data set, inconsistent formats in the data set, inconsistent semantic types in the data set, missing values in the data set, outliers in the data set, duplicate unique values in the data set, or inconsistent units in the data set.

3. The method of claim 2, further comprising:
   invoking the application programming interface with another prompt instructing the generative language model to generate a summary of the data set; and
   inputting the summary of the data set to the generative language model as the context describing the data set.

4. The method of claim 3, further comprising, by an automated summarization agent:
   invoking the application programming interface with a further prompt instructing the generative language model to generate one or more annotations for the data set using a name of the data set, a name of a field of the data set, or values in the data set as context;
   receiving the one or more annotations for the data set from the generative language model; and
   including the one or more annotations in the summary, wherein the one or more annotations produced by the generative language model are employed as the context for generating the data evaluation plan.

5. The method of claim 4, the annotations including a semantic description of the data set produced by the generative language model, semantic types of fields of the data set produced by the generative language model, and textual descriptions of the fields produced by the generative language model.

6. The method of claim 1, further comprising:
   by an automated aggregation and scoring agent, determining a data health score for the data set based at least on the one or more data health issues.

7. The method of claim 6, the data health score being determined by the automated aggregation and scoring agent using at least one of a severity dictionary or a regression model.

8. The method of claim 1, wherein the code written by the generative language model obtains samples from the data set and performs the one or more data evaluation actions of the data evaluation plan on the samples.

9. The method of claim 8, wherein the code performs one or more data cleaning actions on the data set.

10. The method of claim 9, wherein the one or more data cleaning actions include removing values from the data set or changing values in the data set.

11. The method of claim 10, further comprising, by the automated evaluation plan execution agent:

invoking the application programming interface with a further prompt instructing the generative language model to determine whether the one or more data cleaning actions improve data quality of the data set; and responsive to a response from the generative language model indicating that a particular data cleaning action does not improve the data quality of the data set, performing a different data cleaning action on the data set.

12. The method of claim 1, wherein the generative language model comprises a transformer decoder neural network.

13. The method of claim 12, further comprising:

performing pruning or distillation on another generative language model having another transformer decoder neural network to obtain the generative language model, the generative language model having fewer parameters than the another generative language model.

14. A system comprising:

a hardware processing unit; and a storage resource storing computer-readable instructions which, when executed by the hardware processing unit, cause the system to:

access a data set;

generate a prompt requesting a generative language model to generate a data evaluation plan for the data set, the prompt including a summary of the data set as context;

invoke an application programming interface that provides the prompt to the generative language model;

receive the data evaluation plan from the generative language model, the data evaluation plan including one or more data evaluation actions;

invoke the application programming interface with another prompt instructing the generative language model to write code to implement the one or more data evaluation actions of the data evaluation plan;

receive the code from the generative language model; and execute the code, wherein the code, when executed, implements the data evaluation plan by performing the one or more data evaluation actions, the one or more data evaluation actions identifying one or more data health issues in the data set.

15. The system of claim 14, wherein the computer-readable instructions, when executed by the hardware processing unit, cause the system to:

invoke the application programming interface with another prompt instructing the generative language model to generate annotations of the data set; and provide the annotations as context to the generative language model for generation of the data evaluation plan.

16. The system of claim 15, wherein the annotations include a semantic description of the data set produced by the generative language model, semantic types of fields of the data set produced by the generative language model, and textual descriptions of the fields produced by the generative language model.

17. The system of claim 16, wherein the computer-readable instructions, when executed by the hardware processing unit, cause the system to:

include, in the prompt, at least:

data types of fields of the data set, and statistics for a particular field of the data set.

18. The system of claim 17, wherein the statistics include a minimum value, maximum value, and number of unique values of the particular field.

19. A computer-readable storage medium storing computer-readable instructions which, when executed by a processing unit, cause the processing unit to perform acts comprising:

accessing a data set;

generating a prompt instructing a generative language model to generate a data evaluation plan for the data set, the prompt including context describing the data set;

invoking an application programming interface that provides the prompt to the generative language model;

receiving the data evaluation plan produced by the generative language model;

invoking the application programming interface with another prompt instructing the generative language model to write code to implement one or more data evaluation actions of the data evaluation plan;

receiving the code from the generative language model; and executing the code to implement the data evaluation plan, the executing of the code identifying one or more data health issues in the data set.

* * * * *